Aug. 26, 1930.　　　T. R. TINNEY　　　1,774,247
PLUMBING CONNECTION MEANS
Filed Oct. 22, 1928

INVENTOR
*Thomas R. Tinney*
BY
*Brockett, Hyde, Higley & Meyer*
ATTORNEYS

Patented Aug. 26, 1930

1,774,247

UNITED STATES PATENT OFFICE

THOMAS R. TINNEY, OF CONNEAUT, OHIO, ASSIGNOR, BY MESNE ASSIGNMENTS, TO MARY A. LUFF, OF CLEVELAND HEIGHTS, OHIO

PLUMBING CONNECTION MEANS

Application filed October 22, 1928. Serial No. 314,175.

This invention relates to plumbing connection means and more particularly to plumbing fittings for providing connection between lead and iron pipe.

Many plumbing codes require the use of lead pipe lengths as for example leading from a closet connection, and therebelow in the drainage system iron pipe is required. Since threading the lead pipe is impractical, and it is equally impractical to attempt a direct soldered connection between the lead and iron pipe, it is desirable to employ a non-ferrous fitting interposed between the lead and the iron pipe, the non-ferrous member being adapted for connection with the lead pipe by a soldered or so-called wiped joint and with the iron pipe by the usual screw threads.

It is such a fitting that my invention contemplates.

One of the objects of my invention is to provide such a fitting of the simplest possible form and of least relative dimension, and hence at the lowest cost of production. A further object of the invention is to so form the fitting that it can be employed with the greatest of ease. Still another object of my invention is to so form the fitting that the lead pipe, which is the weakest member of the assembly, will be reinforced by the fitting. And another object of my invention is to so form the fitting that the passage through the connection will be as smooth as possible at the jointure of the parts and particularly at the jointure of the fitting with the iron pipe, so that a minimum resistance to flow therethrough will be had.

Figure 1:
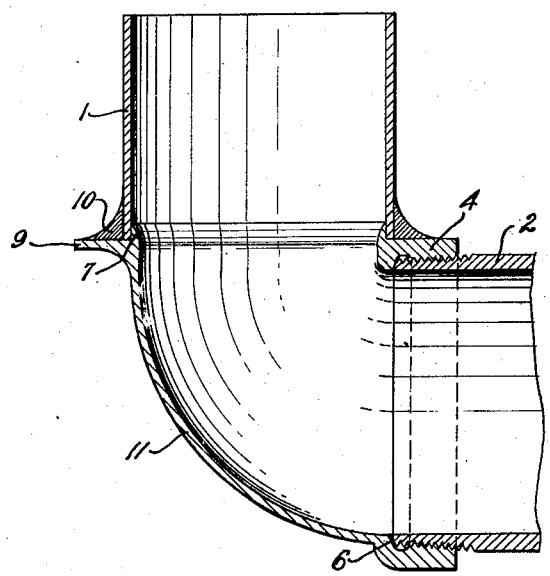

Further objects and advantages of my invention together with the exact nature thereof will be apparent from the following description taken in connection with the accompanying drawings in which the figures represent median sections of plumbing installations of the nature to which reference has been made, showing two embodiments of my invention and the manner of employment of the same, similar parts in the two views bearing similar reference characters. More specifically, Fig. 1 illustrates an embodiment of my invention wherein two pipes disposed at right angles have connection; and Fig. 2 similarly represents an embodiment wherein a lead pipe section has connection with an iron elbow fitting.

Figure 2:
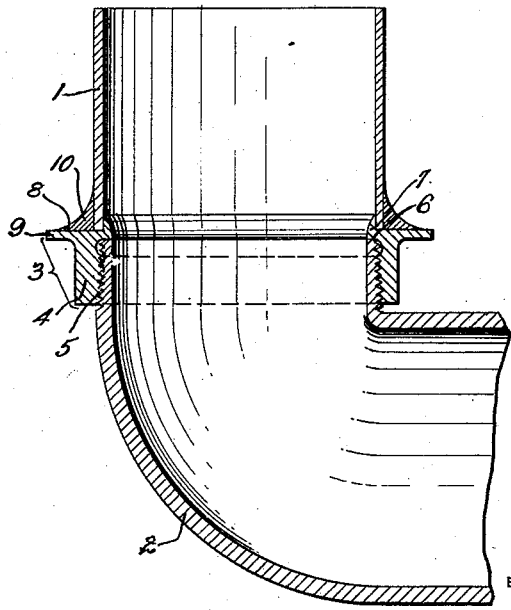

With reference now particularly to Fig. 2 of the drawings, 1 is the lead pipe section and 2 is the iron pipe section, here shown in the form of an elbow fitting, and 3 is the fitting, of non-ferrous material such as brass, by which connection is had between the two pipes in my fitting. The fitting is generally in the nature of a ferrule having the through opening indicated.

The fitting has at one end a neck portion 4 internally threaded as at 5 to receive the end of the pipe 2 which is correspondingly threaded in the usual manner. Threads 5 lead to a transversely extending face 6 against which the end of the pipe 2 may seat.

The opposite end of the member 3 is provided with a nipple portion 7 inwardly chamfered as indicated, and outwardly cylindrical to fit within the mouth of the lead pipe 1. This end of the fitting also has a transversely extending face 8 forming a square shoulder with the periphery of the nipple portion 7, which the end of the pipe 1 may abut, and a flange portion 9 transversely extending to increase the dimension of the face 8. An annular shoulder of rectangular section is thus formed by the outer extremity of the end of the pipe 1, together with the face 8, which shoulder is adapted to receive the solder fillet 10 produced by wiping as in the usual manner in the plumbing art.

It will be noted that the base portion of the nipple portion 7 forms the shoulder against which the iron pipe end seats, and the inner dimension of the fitting 3 at this point is the same as that of the adjacent mouth of the pipe 2, whereby the passage between the pipe 2 and the fitting 3 has an uninterrupted wall so that flow is not obstructed. Likewise the chamfer of the nipple portion 7 insures a minimum of resistance to flow in the passage between the fitting 3 and the lead pipe 1.

With reference now to Fig. 1 the general arrangement, at least in its ultimate effect, is similar, but here the pipe 2 is a straight section and the bend is formed in the connection member 3; that portion 11 thereof intermediate of its ends as described, and which may be considered as the base portion of the nipple portion 7, being extended to provide a curved passage-way of circular section as in the ordinary elbow. Thus this form of my invention lends itself readily to accommodation of one size of lead pipe with another size of iron pipe arranged at an angle thereto.

What I claim is:

1. A plumbing fitting for providing connection between lead and iron pipe, comprising a non-ferrous member with a through opening and having an end adapted for connection with the iron pipe, and at its opposite end a nipple adapted to fit within the mouth of the lead pipe and a flange portion adjacent the nipple adapted to abut the lead pipe end and extending transversely therebeyond to form with the lead pipe an annular shoulder which may receive the solder fillet of a wiped joint, whereby when the joint is formed the lead pipe is supported by said nipple on the inside, and by said fillet on the outside.

2. A plumbing fitting for providing connection between lead and iron pipe, comprising a non-ferrous member with a through opening and having an end adapted for connection with the iron pipe, and at its opposite end a nipple adapted to fit within the mouth of the lead pipe and a flange portion adjacent the nipple adapted to abut the lead pipe end and extending transversely therebeyond to form with the lead pipe an annular shoulder which may receive the solder fillet of a wiped joint, said nipple being inwardly chamfered whereby flow through said opening will have minimum restriction.

In testimony whereof I hereby affix my signature.

THOMAS R. TINNEY.